Aug. 17, 1943.   H. J. CRINER   2,327,018
MACHINE FOR CUTTING BREAD
Filed Aug. 11, 1941   2 Sheets-Sheet 1
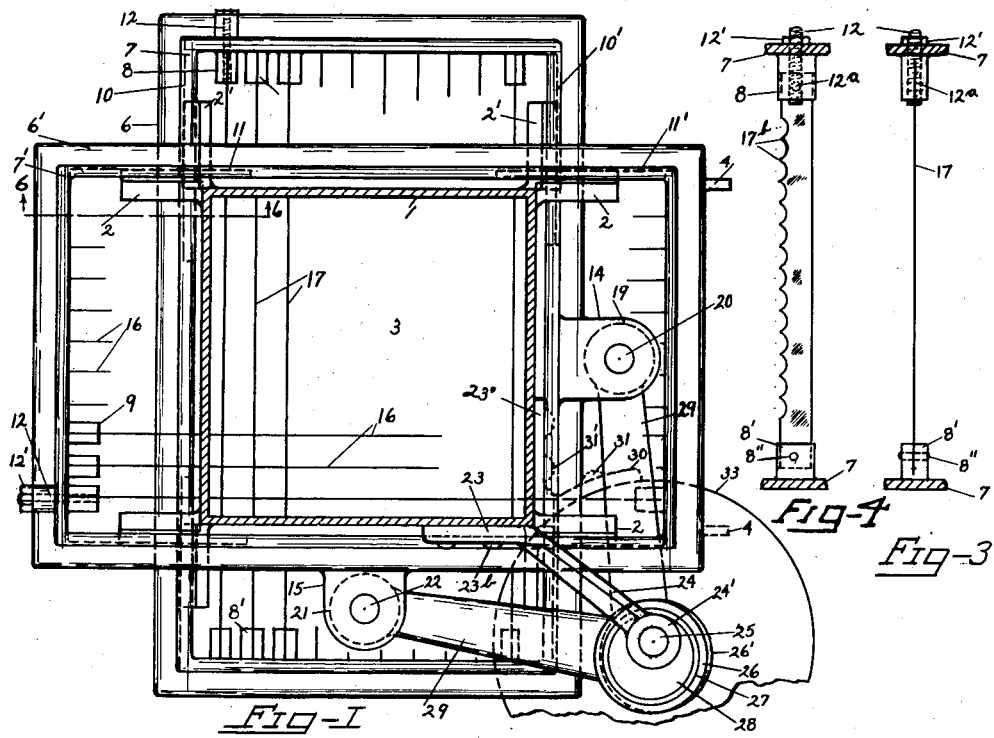
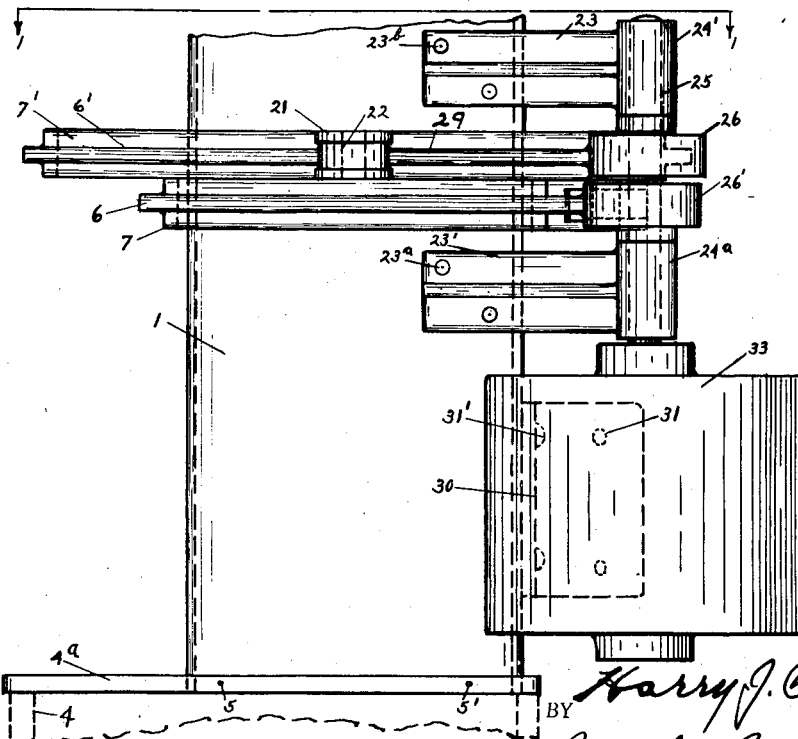
INVENTOR.
Harry J. Criner,
BY Bush & Bush ATTORNEYS

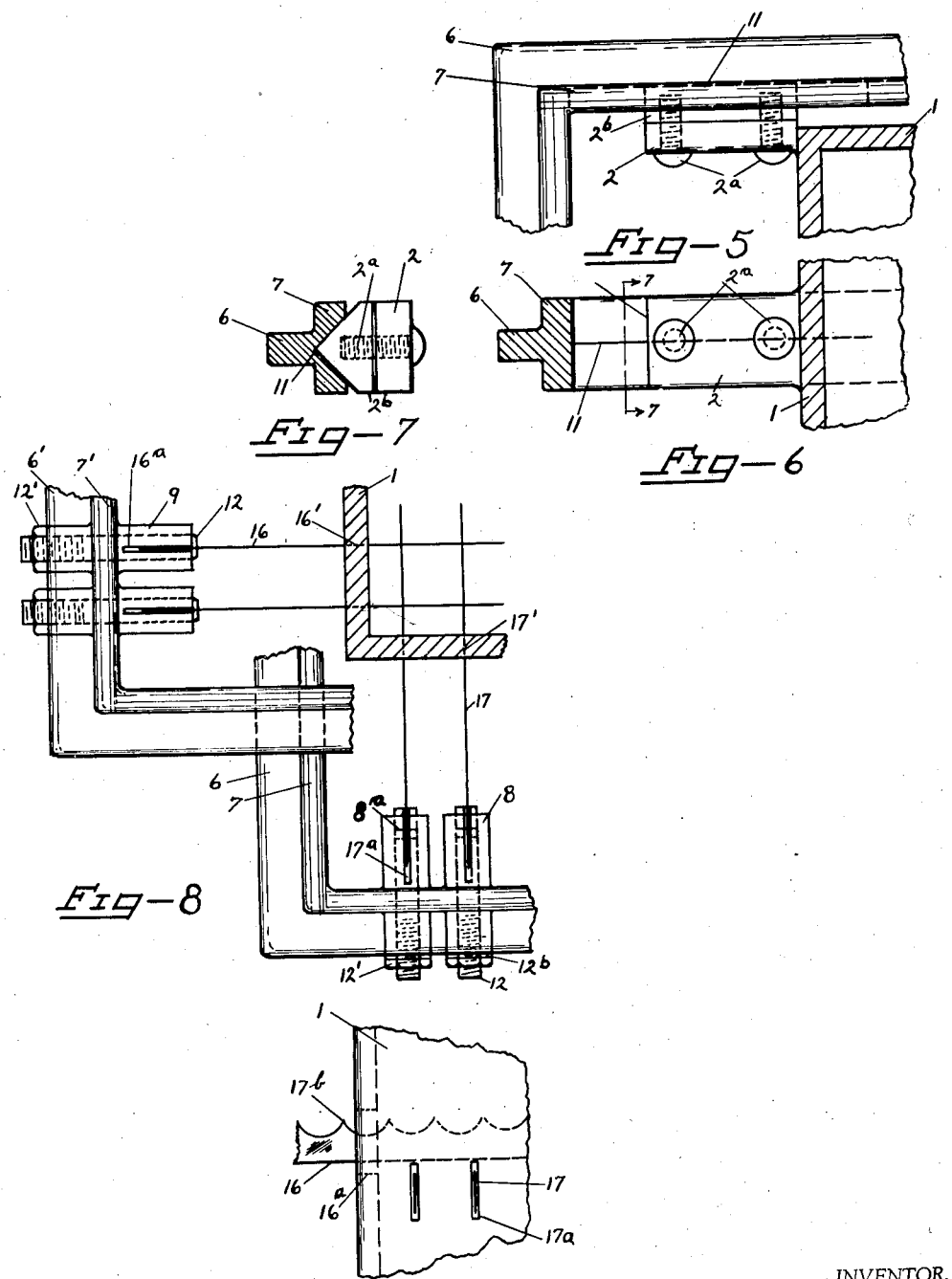

Patented Aug. 17, 1943

2,327,018

UNITED STATES PATENT OFFICE 2,327,018

MACHINE FOR CUTTING BREAD

Harry J. Criner, Davenport, Iowa, assignor of one-half to A. G. Bush, Davenport, Iowa Application August 11, 1941, Serial No. 406,323

6 Claims. (Cl. 146—78)

My invention relates to machines for cutting bread and similar materials into small cubes or fingers.

The objects of my invention are to provide a machine of superior simplicity, ease of operation and economy of manufacture, by which sliced loaves of stale bread may be cut into cubes or fingers, such cubes and fingers being suitable for toasting to form croutons or for toasting or frying with butter or other suitable medium for use in soups or with spreads or as appetizers or in various other ways. Other objects will appear in the description.

I accomplish these objects by the means illustrated in the accompanying drawings, in which, Figure 1 is a plan view of my apparatus, but showing the upper portion of the chute in section;

Figure 2 is a side elevation with a portion of the base omitted;

Figures 3 and 4 are details of the cutting blades;

Figures 5 and 6 are sectional details to show the method of mounting the reciprocating frames upon the chute;

Figure 7 is an enlarged sectional detail on the line 7—7 of Figure 6;

Figure 8 is an enlarged detail showing the arrangement of the blades passing laterally through the chute; and Figure 9 is a detail showing a partial side elevation of the chute showing the blades in the slots thereof.

Similar numerals refer to similar parts throughout the several views.

My apparatus comprises a rectangular body or chute 1 which may be of metal or other material of suitable dimensions to afford the necessary strength. It is rectangular in section and of sufficient height to accommodate the motor and cutting frames and to extend upwardly above the cutting blades far enough to afford a firm lateral support for a loaf of bread or similar object.

The chute 1 is made of rectangular form with straight sides and of a size to conform to the width and height of the loaves of bread which it is designed to operate upon.

The base comprises a table 4a with legs 4 which may be united by plates or other suitable means to brace them.

The base 4a is provided with a suitable aperture 3 under the chute 1 and the legs of the base 4 are set far enough apart to permit a container to be placed between them to catch the cubed portions of the bread as they fall from the lower side of the blades.

To the body of the chute a bracket or saddle 30 is secured by bolts 31' or other suitable means and this bracket carries an electric motor 33 secured by bolts 31. The motor shaft 25 is extended upwardly parallel with the chute and at one corner thereof and is held in place by bearings in the bosses 24" and 24a formed integral with the brackets 23 and 23" and united to the chute by bolts 23b and 23a. Intermediate these bosses a pair of eccentrics 28 are mounted upon or formed integral with the shaft 25. These eccentrics are preferably surrounded by oilless bearings 27 which in turn are surrounded and held by suitable rings 26 and 26' formed integral with the connecting rods 29. The opposite ends of the connecting rods are provided with heads 21 and 19 respectively which in turn are pivotally mounted in the bosses 15 and 14 united to the blade frames 7 and 7' respectively.

The blade frames are rectangular frames 7 and 7' and are slightly wider than the chute and formed with sufficient length to permit the desired reciprocating movement thereof.

These frames are preferably reenforced by the flanges 6 and 6' united thereto and extending outwardly therefrom.

The inner faces of the side frames are formed with integral V-shaped grooves 11 extending lengthwise thereof. Arms 2 and 2' are united to the chute 1 and extend lengthwise of the respective frames.

V-shaped bearing blocks 2b are united to or formed integral with the arms 2 and extend into the V-shaped grooves 11 of the frames so as to act as supports and guides for the frames and to maintain the frames in their horizontal spaced position at all times.

The bearing blocks 2b may be secured to the arms 2 by set screws 2a or other suitable means and may be adjusted by the insertion of shims between the blocks 2b and the arms 2 in order to take up any play that may be caused by wear.

Upper slots 16a and lower slots 17a are cut in the sides of the chute to permit insertion of the blades 16 and 17. The cutting blades 16 and 17 are secured in their respective frames 7' and 7, one end of each blade being attached to one end of its frame by a pivot pin 8" extending through a slotted lug 8' formed integral with the frame 7 and the other end of such blade being secured by a pin 12a to a bolt 12 mounted in a slotted lug 8 united to the other end of the frame. The bolt 12 extends through a suitable bore formed in the frame end, and may be adjusted by tightening or loosening the nut 12' threaded upon the projecting end of the bolt 12.

The lower end of the chute 1 may be secured to the base 4a by rivets 5 and 5' or other suitable means.

In the operation of my machine, the machine is set up by having the chute 1 secured to the base 4a. The motor is then mounted in the saddle 30 with its shaft extending through the bosses in the arms or brackets 23, 23'. The saw blades are inserted through the slots and sides of the chute in the upper and lower series and united to their respective frames as described.

The connecting rods are then mounted on the eccentrics of the shaft with their heads 19 and 21 secured by pivot pins 20 and 22 to the lugs or bosses 14 and 15 united to the respective frames. The connecting rods stand at approximately right angles to each other so that the rotation of the motor shaft and eccentrics will cause the frames to reciprocate simultaneously in spaced horizontal planes and to travel at right angles to each other in those planes.

Lock washers 12b may be used to lock the nuts 12' in their desired position.

One purpose of my machines is to permit the utilization of sliced bread which has become a day or two old and which has to be taken back by a baker on that account. The sliced loaves are manually fed lengthwise into the upper end of the chute 1 and descend by gravity to the upper series of blades 16. The slices are cut into fingers by this series of blades and the fingers are then pushed downwardly into contact with the lower series of blades 17 where the fingers are cut into cubes the dimensions of which will correspond to the thickness of the original slices of bread.

When desired, one of the frames may be readily removed by loosening its set screws 2a and the slices of bread will then simply be cut into fingers extending the width or height of the loaf.

When desired to obtain only fingers, the unsliced loaves may be placed in the chute and cut in long rectangular fingers by the two sets of blades or if desired to cut long slices of bread, one of the sets of blades may be removed and the loaf will then be cut into slices extending the full length of the loaf.

In order to permit smooth cutting of the cubes with a relatively short travel of the blades, I utilize a thin blade of steel or other suitable material having pointed scallops with the points of the scallops separated only a short distance, preferably not more than one-fourth of an inch. The use of such a blade will permit satisfactory operation with a longitudinal travel of approximately one inch, thus permitting the use of relatively small eccentrics and obviating or reducing vibration.

The frames 7 and 7' are preferably made of aluminum or other light metal. The bearing blocks extend beyond the sides of the chute so as to provide long bearings for the frames and to permit the frames to be driven by connecting rods attached to one of the long sides thereof without the frames binding upon their bearings.

This construction permits reducing the size of the machine to a very small compass and obviates the necessity of shafting and gearing to drive the frames simultaneously.

I am aware that series of blades crossing at right angles have been utilized for cutting vegetables and fruits but none of such machines which have come to my knowledge could be utilized for cubing sliced loaves of bread.

It is obvious that various modifications of my apparatus may be made without departing from the spirit of my invention and I do not limit my claims to the precise form and proportions shown in the drawings.

I claim:

1. A bread-cutting apparatus comprising a horizontal base, a vertical rectangular chute mounted upon the base and having transverse dimensions corresponding to the width and thickness of a loaf to be sliced, a pair of blade-carrying frames mounted in spaced horizontal planes one above the other upon and surrounding the chute and movable horizontally at an angle to each other, each frame carrying a plurality of thin cutting blades standing on edge and with their cutting edges uppermost, said frames being formed with longitudinal V-shaped grooves on their inner faces, pairs of V-shaped bearing blocks mounted upon the sides of the chute arranged to receive the blade-carrying frames and to support and guide said frames, the chute being slotted to permit travel of the blades transversely through the chute, and means for driving the frames simultaneously.

2. A bread-cutting apparatus comprising a horizontal base, a vertical rectangular chute mounted upon the base and having transverse dimensions corresponding to the width and thickness of a loaf to be sliced, a pair of blade-carrying frames mounted in spaced horizontal planes one above the other upon and surrounding the chute and movable horizontally at an angle to each other, each frame carrying a plurality of thin cutting blades standing on edge and with their cutting edges uppermost, said frames being formed with longitudinal V-shaped grooves on their inner faces, pairs of V-shaped bearing blocks adjustably mounted upon the sides of the chute arranged to receive the blade-carrying frames and to support and guide said frames, the chute being slotted to permit travel of the blades transversely through the chute, and means for driving the frames simultaneously.

3. A bread-cutting apparatus comprising a horizontal base, a vertical rectangular chute mounted upon the base, a pair of blade-carrying frames movably mounted upon and surrounding the chute in spaced horizontal planes one above the other, each frame carrying a plurality of cutting blades standing on edge and with their cutting edges uppermost, the chute being slotted to permit travel of the blades of each series transversely through the chute at right angles to the other series, and means for driving the frames simultaneously, said means comprising a vertical driving shaft revolvably mounted at one corner of the chute and parallel thereto, upper and lower eccentrics mounted upon the shaft in line with the frames respectively and upper and lower connecting rods each having one end arranged to encircle its corresponding eccentric and the other end pivotally mounted in a boss united to the corresponding frame.

4. A bread-cutting apparatus comprising a horizontal base, a vertical rectangular chute mounted upon the base and having transverse dimensions corresponding to the width and thickness of a loaf to be sliced, a pair of blade-carrying frames mounted in spaced horizontal planes one above the other upon and surrounding the chute and movable horizontally at right angles to each other, each frame carrying a plurality of thin cutting blades standing on edge and with their cutting edges uppermost, said frames being formed with parallel elongated side bars having parallel longitudinal V-shaped grooves formed on the inner faces of the side bars, pairs of V-shaped bearing blocks mounted upon the sides of the chute adjacent to and arranged to receive the side bars whereby the side bars may slide longitudinally on said bearing blocks to be supported and guided thereby, the chute being slotted to permit travel of the blades transversely through the chute, and means for driving the frames simultaneously.

5. A bread-cutting apparatus comprising a horizontal base, a vertical rectangular chute mounted upon the base and having transverse dimensions corresponding to the width and thickness of a loaf to be sliced, a pair of blade-carrying frames mounted in spaced horizontal planes one above the other upon and surrounding the chute and movable horizontally at right angles to each other, each frame carrying a plurality of thin cutting blades standing on edge and with their cutting edges uppermost, said frames being formed with parallel elongated side bars having parallel longitudinal V-shaped grooves formed on the inner faces of the side bars, pairs of V-shaped bearing blocks adjustably mounted upon the sides of the chute adjacent to and arranged to receive the side bars whereby the side bars may slide longitudinally on said bearing blocks to be supported and guided thereby, the chute being slotted to permit travel of the blades transversely through the chute, and means for driving the frames simultaneously.

6. In a bread cutting apparatus, the combination with a base, of a rectangular chute mounted upon the base at right angles thereto, a pair of blade-carrying frames movably mounted upon and surrounding the chute in spaced planes at right angles to the chute, each frame carrying a plurality of cutting blades standing on edge with their cutting edges pointing in the same direction, slots on opposite sides of the chute to permit travel of the blades of each series transversely through the chute at right angles to the chute and to the other series, and driving means comprising a shaft mounted upon the chute at one corner thereof and parallel thereto, spaced drivers mounted upon the shaft in line with the frames respectively and connecting rods each having one end pivotally united to its corresponding driving means and the other end pivotally united to its corresponding frame.

HARRY J. CRINER.